Dec. 18, 1951     E. E. LIPPMANN ET AL     2,579,237
WEIGHING AND PACKAGING APPARATUS
Filed Jan. 31, 1946     4 Sheets-Sheet 1
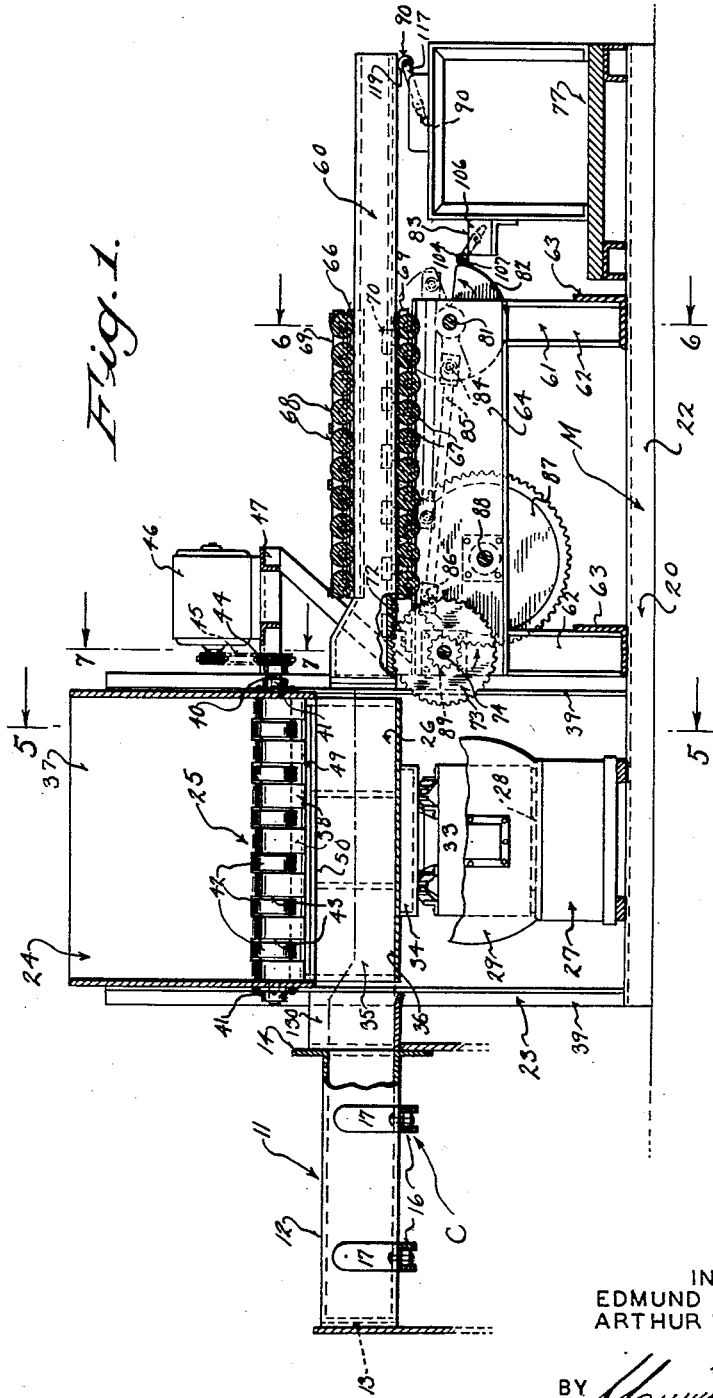
INVENTORS
EDMUND E. LIPPMANN
ARTHUR W. LIPPMANN
BY *Maurey Wright*
ATTORNEYS

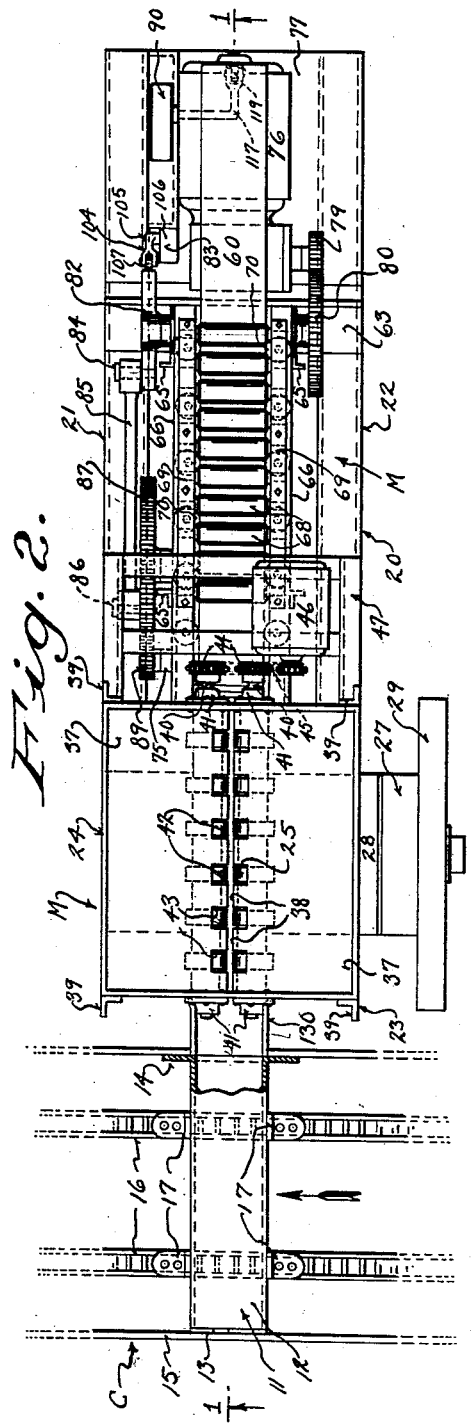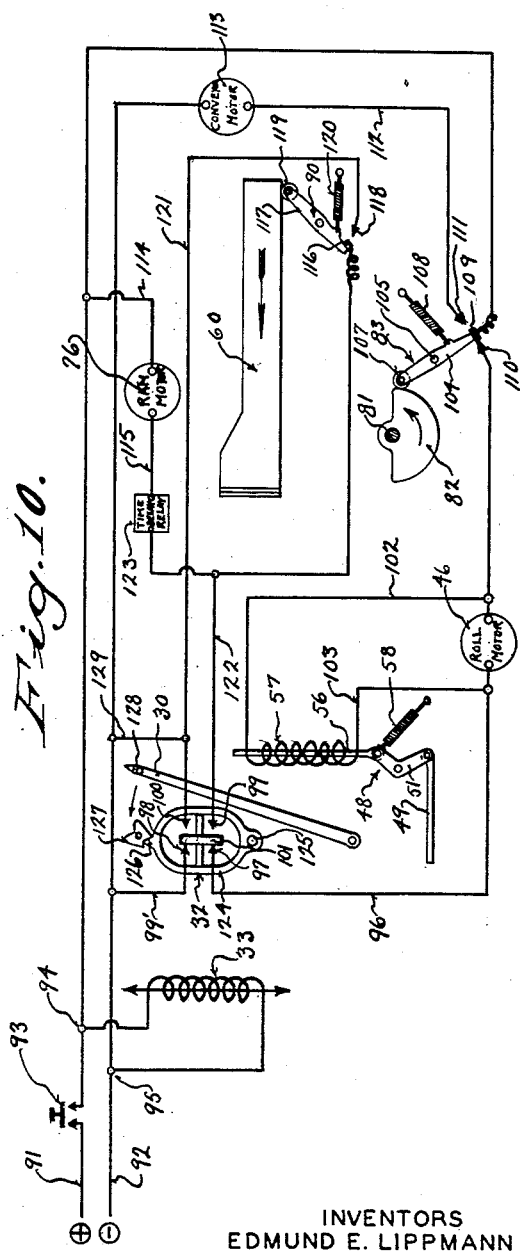
INVENTORS
EDMUND E. LIPPMANN
ARTHUR W. LIPPMANN
ATTORNEYS

Dec. 18, 1951     E. E. LIPPMANN ET AL     2,579,237
WEIGHING AND PACKAGING APPARATUS
Filed Jan. 31, 1946     4 Sheets-Sheet 3
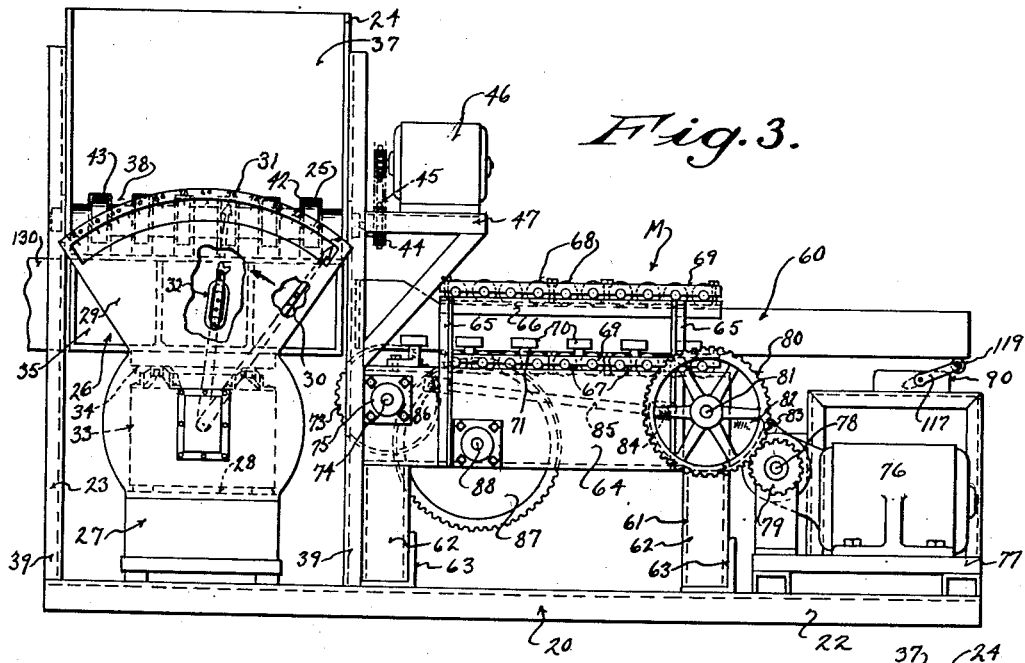
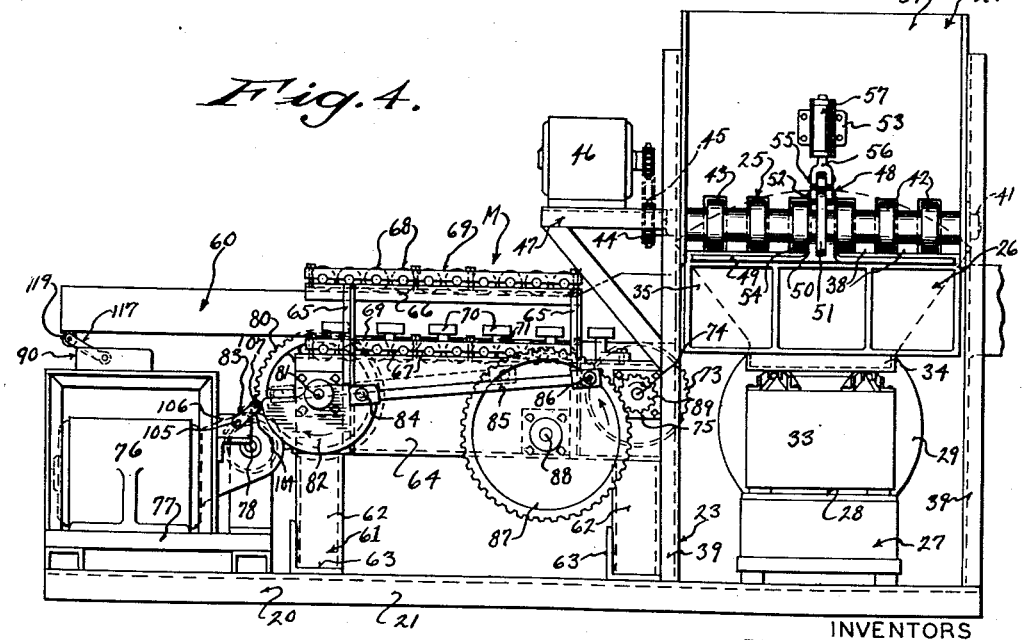
INVENTORS
EDMUND E. LIPPMANN
ARTHUR W. LIPPMANN
BY
ATTORNEYS Dec. 18, 1951   E. E. LIPPMANN ET AL   2,579,237
WEIGHING AND PACKAGING APPARATUS
Filed Jan. 31, 1946   4 Sheets-Sheet 4

INVENTORS
EDMUND E. LIPPMANN
ARTHUR W. LIPPMANN
BY
ATTORNEYS

Patented Dec. 18, 1951

2,579,237

UNITED STATES PATENT OFFICE 2,579,237

WEIGHING AND PACKAGING APPARATUS

Edmund E. Lippmann and Arthur W. Lippmann, Milwaukee, Wis.

Application January 31, 1946, Serial No. 644,622

8 Claims. (Cl. 249—17)

This invention appertains to packaging, and more particularly to a novel machine for filling a predetermined quantity of desired objects in packing or shipping cartons.

One of the primary objects of our invention is to provide a complete automatic device for packing, by weight, a predetermined quantity of articles, such as welding rods, in cartons, whereby each of the cartons will contain substantially the same amount of the articles, and whereby the cartons can be rapidly and economically filled with the expenditure of a minimum amount of time and labor.

Another salient object of our invention is to provide a novel mechanism for delivering articles to a suitable transfer guide or bin for stacking or arranging the articles to fit a predetermined sized carton, with means for moving the articles from said guide or bin to a carton when the articles in the transfer guide reach a predetermined exact weight.

A further object of our invention is to provide means for mounting the transfer guide or bin on the platform of a weighing scale, so that the articles will be accurately weighed as they are deposited in said guide with means actuated by the scale pointer for closing a motor circuit when a predetermined weight of the articles in the guide is reached for operating a reciprocating ram, whereby the articles in the guide can be quickly transferred and pushed in a waiting carton.

A further important object of our invention is to provide novel means for vibrating the transfer guide or bin on the platform of the weighing scale, so as to insure the correct compact stacking of the articles in the bin, whereby the articles can be pushed in the carton as a compact bundle.

A further object of our invention is to provide automatic means for stopping the feed of the articles from the supply hopper to the bin when the exact desired weight of the articles in the bin is reached.

A still further object of our invention is to provide automatic means for returning the ram to its initial position after the articles have been transferred from the guide or bin to a carton and for automatically allowing the feeding of the articles to the bin when the ram has returned to its initial starting position.

A still further object of our invention is to provide a compact and rugged machine which will effectively accomplish its purpose with a minimum amount of attention on the part of an attendant, a simple and efficient means being provided for insuring the proper correlated functioning of the various elements of the machine relative to one another.

With these and other objects in view, the invention consists in the novel construction, arrangement and formation of parts, as will be hereinafter more specifically described, claimed and illustrated in the accompanying drawings, in which drawings:

Figure 1 is a longitudinal sectional view through our improved rod packing machine, the section being taken substantially on the line 1—1 of Figure 2, looking in the direction of the arrows.

Figure 2 is a top plan view of the machine with parts thereof broken away and in section, a carton being shown in position for receiving a bundle of welding rods.

Figure 3 is a side elevational view of the machine with parts thereof broken away to illustrate structural features.

Figure 4 is a side elevational view showing the opposite side of the machine from that shown in Figure 3.

Figure 10 is a diagrammatic view illustrating one simple method, which can be utilized for operating the various control meters, solenoids, and the like.

Figure 5:
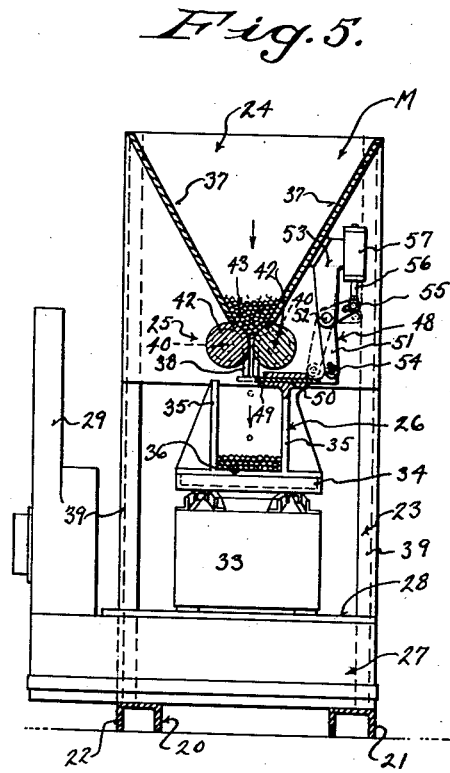
Figure 5 is a transverse sectional view through the machine taken substantially on the line 5—5 of Figure 1, looking in the direction of the arrows, and illustrating the means for feeding the articles from the hopper to the transfer guide or bin, the view also showing the automatic cut-off for the hopper.
Figure 6:
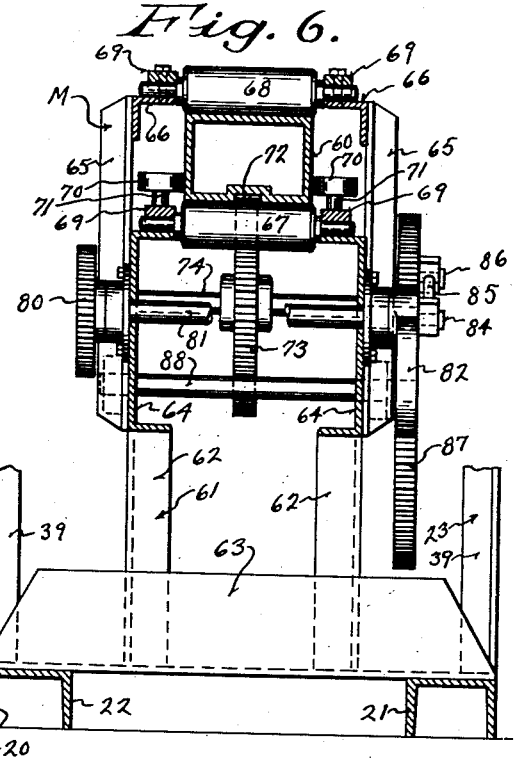
Figure 6 is a transverse sectional view through the machine, taken substantially on the line 6—6 of Figure 1, looking in the direction of the arrows, the view being on a larger scale than Figures 1 to 5, inclusive, the view illustrating the novel means for mounting the reciprocating ram on the machine.

Referring to the drawings in detail, wherein similar reference characters designate corresponding parts throughout the several views, the letter M generally indicates our improved machine, and the same cooperates with a conveyor C, utilized for carrying cartons, or the like 11, in proper timed relation to and from the machine M.

The conveyor, while cooperating with the machine M, does not form a part of the present invention, and such conveyor, with the carton flap opening mechanism, flap sealing and closing mechanism, forms a part of a separate invention.

It is to be noted, however, that the conveyor C includes a frame 15, having an endless belt or chain 16. This belt is provided, at spaced points, with flights or guides 17, for receiving and holding a carton 11. The carton 77 can be formed from corrugated board, or the like, and includes a body 12 having closing flaps 13 and 14 at its opposite ends. The flaps 13 can be sealed, if so desired, when the cartons are placed in position on the conveyor. The flaps 14 are left open so that the end of the carton facing the machine will be open to receive the bundle of welding rods or other articles.

Our machine M includes a base 20 constructed in any desired manner, but as illustrated, the same includes a pair of spaced parallel, longitudinally extending channel irons, or the like, 21 and 22, and these channel irons can be connected and braced by suitable cross members.

Mounted upon the base 20 is a frame 23 for supporting the hopper 24, and the feed mechanism 25, for delivering the welding rods, one at a time, to the transfer guide or bin 26. Arranged within the frame 23 and on the base 20, is the weighing scale 27.

The weighing scale is of a type now found on the market and is of the character having a horizontally disposed platform 28 on which the articles to be weighed are normally placed. Rising from the base of the weighing scale 27, is a casing 29 in which moves an indicating pointer 30. The indicating pointer 30 travels over a scale plate 31 for indicating the weight of articles on the platform. The scale itself forms no part of the present invention other than in the novel combination thereof with other features of the invention. However, the pointer 30 is utilized for tripping a switch mechanism 32, for a certain purpose, which will be later described.

Mounted directly upon the platform 28 is a vibrator 33 and the shaking platform 34 of the vibrator has securely mounted thereon, the transfer guide or bin 26.

The vibrator is also of a commercial type now found in the open market, and hence will not be described in detail. However, it is to be understood that the combination of the weighing scale 27, the vibrator 33 and the transfer guide or bin all cooperate together to produce a certain desired result in the operation of our machine.

The transfer guide or bin 26 is of a U shape in cross section, and includes spaced parallel upright side walls 35 and a bottom wall 36, which is mounted on the shaking platform 34 of the vibrator, as previously brought out. The ends of the transfer guide or bin are open, and the guide or bin extends longitudinally of the machine and directly below the hopper 24.

Figure 7:
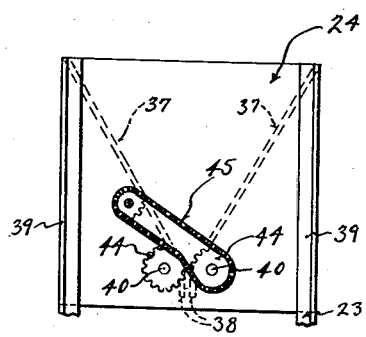
Figure 7 is a fragmentary detail transverse sectional view, taken on the line 7—7 of Figure 1, looking in the direction of the arrows, the view illustrating the drive means for the feeding mechanism for insuring the delivering of the articles from the hopper to the transfer guide or bin, the view being on the same scale as Figures 1 to 5, inclusive.

The hopper 24 includes downwardly and inwardly inclined converging side walls 37 and the lower edges of the walls are spaced and terminate in depending spaced parallel guide flanges 38. These flanges are arranged centrally of the transfer bin and it is to be noted that the hopper 24 is secured to uprights 39 which are in turn rigidly fastened to the base 20. The spaced flanges 38 define a delivery mouth or chute, and obviously, the weight of the articles and the inclined walls 37 tend to feed the said articles in the hopper to this chute. In order to insure the feeding of the articles one at a time, and to prevent the too rapid feeding of the articles to the guide or bin, we provide a pair of spaced parallel shafts 40. These shafts are mounted in suitable bearings 41 carried by the end walls of the hopper and the shafts carry, for rotation therewith, discs 42, which extend into the chute through slots 43, formed in the lower ends of the hopper and spaced flanges 38. The forward terminals of the shafts 40 have keyed, or otherwise secured thereto, sprocket wheels 44, and these wheels are driven by a sprocket chain 45. The sprocket chain is in turn driven from the armature shaft of an electric motor 46, which can be supported on a suitable bracket, or the like, 47, carried by the uprights 39 for the hopper. By referring to Figure 7, it can be seen that the sprocket chain 45 is trained about one sprocket wheel 44 and that one run of the chain engages the other sprocket wheel, and hence the chain drives the discs 42 together. The discs function to prevent the choking of the chute and to cause the dropping of one rod at a time therein.

A means 48 is provided for cutting off the delivering of the welding rods or other articles from the chute to the transfer bin or guide 26 at predetermined times, as will be later set forth. This mechanism 48 includes a sliding shut-off gate 49 movable under and away from the chute. A guide 50 is provided for the gate to insure the proper sliding movement thereof. A bell crank 51 is rockably mounted at its angle, as at 52, on a bracket 53. The bracket 53 can be fastened to the hopper 24. The lower arm of the bell crank 51 is operatively united to the sliding gate 49 through a pin and slot connection, as indicated by the reference character 54. The upper arm of the bell crank is operatively connected through a pin and slot connection, as at 55, to the armature 56 of a solenoid 57. The solenoid can be connected to the bracket 53. A spring 58 is utilized for quickly moving the gate to a closed position under the lower end of the chute 38 and the solenoid 57, when energized, functions to quickly move the gate to an open position away from the chute. This will be more fully set forth as the description proceeds.

So far, it can be seen that the welding rods are delivered to the transfer guide bin or chute 26 from the hopper at a predetermined rate and that the transfer bin is mounted upon a vibrator 33 for leveling off and compacting the welding rods in the transfer guide bin. In view of the fact that the vibrator is mounted upon the weighing scale 27, the weight of the rods in the transfer guide bin will effect the pointer 30. Obviously, the weight of the vibrator 33 and the transfer guide bin 26 is taken into consideration during the weighing of the welding rods.

The mechanism just described is arranged at the forward end of the base 20 and the base carries a reciprocating ram 60 utilized for moving a bundle of welding rods, when the same reach a predetermined weight, from the transfer guide or bin to a waiting carton 11. This ram is mounted in a novel manner upon the base, so that the ram will be held in perfect alignment with the transfer guide or bin and so that ease of travel of the ram is assured. The base 20 carries a frame 61 for the ram and this frame can include corner uprights or standards 62 which are welded or otherwise fastened to transversely extending angle brace irons 63. These brace members 63 are in turn welded or otherwise fastened to the longitudinal base beams 21. The upper ends of the uprights or standards 62 have secured thereto a pair of spaced parallel longitudinally extending channel beams 64 and these beams are preferably arranged with their flanges facing inwardly and the beams not only form a support for the ram, but also means for supporting parts of the operating mechanism for the ram. The outer faces of the beam 64 have welded or otherwise secured thereto, upright posts 65, and the upper ends of these posts carry spaced parallel longitudinally extending angle iron beams, or the like, 66. The ram 60, itself, is arranged centrally between the channel beams 64 and the top beams 66, and these beams 64 and 66 carry, respectively, bottom and top sets 67 and 68 of transversely extending guide rollers. The ram is supported by the rollers and slides between said upper and lower sets of rollers. The terminals of the rollers of the sets are rotatably mounted in suitable bearings 69, carried by the beams 64 and the top beams 66.

To prevent transverse shifting of the ram and to further facilitate the movement thereof, antifriction guide wheels 70 are provided. These guide wheels engage the opposite sides of the ram at spaced points and are rotatably mounted upon suitable stub axles or pins 71, carried by the top bearing caps of the bearings 69, which are mounted on the beams 64.

In order to reduce the weight of the ram 60, the same is of a hollow construction and its lower face is provided with a longitudinally extending centrally disposed rack bar 72. The rack bar is preferably set into the lower face of the ram and if desired, the teeth of the rack bar can be formed directly on said ram.

In meshing engagement with the rack bar 72 is a large spur gear 73, and this spur gear is keyed or otherwise secured to an operating shaft 74 rotatably mounted in bearings 75 mounted on the longitudinal beams 64. The operating mechanism for the shaft 74 will be later described and it can be seen that when the shaft is rotated in one direction, that the ram will be fed forwardly and that when the shaft is rotated in a reverse direction, that the ram will be returned to its rearward position.

The mechanism for operating the ram includes an electric drive motor 76 and this motor is securely fastened to a platform 77 carried by the base 20. This motor drives through the medium of a desired reduction gear, a cross shaft 78. This cross shaft 78 has keyed or otherwise secured thereto a spur gear 79 which is in meshing driving engagement with a relatively large gear 80 of the desired ratio. The gear 80 is in turn keyed or otherwise secured to a cross shaft 81 journaled in bearings carried by the standards 62 and the end of this shaft, remote from the gear 80, has keyed or otherwise secured thereto a cam 82 utilized for opening and closing the circuit to the motor 76 through a switch trip mechanism 83, which will also be later described. Pivotally connected, as at 84, to the cam 82, is a pitman or connecting rod 85, and the forward end of this rod is in turn pivotally connected, by means of a wrist pin 86, to a drive gear 87. The drive gear 87 can be keyed or otherwise fastened to a transversely extending shaft 88. This shaft is mounted in suitable bearings carried by the longitudinal beams 64. The drive gear 87 is in meshing driving engagement with a relatively small spur gear 89 and this gear is keyed or otherwise fastened to the shaft 74 utilized for operating the pinion 73. The pinion 73 engages the rack bar on the ram 60.

Referring to Figure 4 of the drawings; as the shaft 81 is driven, the cam 82 rotates, and the connecting rod 85 will drive the gear 87. The rotation of the gear 87 will drive the gear 89 in a clockwise direction and hence the ram 60 will be moved into the transfer guide bin or chute 26 and when the cam 82 has made one complete half revolution, the ram will have been moved forwardly a sufficient distance to transfer the entire bundle of welding rods into a waiting carton 11. This position of the connecting rod is shown in dotted lines in Figure 4. On the next half revolution of the cam 82, the connecting rod 85 will again be moved back to its forward position, and hence the gear 87 will turn in a clockwise direction, and the ram 60 will be returned to its normal position and out of the bin.

It will be noted that a trip switch 90 is arranged in the path of travel of the ram 60 and is arranged adjacent to the rear end of the ram. When the ram moves forwardly, the switch is tripped to a circuit closing position for a purpose, which will be described.

In Figure 10 of the drawings, we have illustrated a simple electric diagram of the arrangement of the various switches used for controlling the operation of the machine, and in this figure, lead and return wires 91 and 92 are shown. These wires lead from any suitable source of electric energy. The wire 91 can have interposed in the length thereof any preferred type of manually operated switch 93 for opening and closing the various circuits utilized and this switch is employed for starting and stopping the operation of the machine. The vibrator 33 utilized for leveling the welding rods in the transfer bin or chute 26, operates continuously if the switch 93 is closed and the terminals of the vibrator are connected respectively to the wires 91 and 92, as indicated by the numerals 94 and 95. The lead wire 91 leads through trip switch 83 to one terminal of the motor 46 utilized for operating the rolls or shafts 40 for controlling the feed of the welding rods to the transfer guide or bin 26. The other terminal of the motor 46 has electrically connected thereto a wire 96 which leads to an electric contact 97. Arranged in spaced relation to the contact 97 is a similar contact 98, and this contact has electrically connected therewith a conductor 99, which is in turn electrically connected to the return wire 92. The contacts 97 and 98 form a part of the trip switch 32 utilized in the weighing scale, and as stated, this switch will be later more fully described. It is to be noted, however, at this time, that the switch 32 also includes another pair of spaced contacts 99 and 100, and that a movable conductor bridge bar 101 moves from one pair of contacts to the other to bridge either of the pairs of contacts. Electrically connected with the lead wire 91 on one side of the motor 46 is a conductor 102, which is electrically connected with one terminal of the solenoid 57 and the other terminal of the solenoid has electrically connected therewith a conductor 103 which is in turn electrically connected with the wire 96.

The cam 82 is employed for operating the trip switch 83 and this switch in turn controls the opening and closing of the circuit to the motor 46 and the solenoid 57, and hence the wire 91 has interposed in the length thereof and in advance of the motor 46 and the solenoid 57, a part of the trip switch mechanism 83. This trip switch mechanism 83 includes a switch lever 104, which is rockably mounted intermediate its ends on a pivot pin 105 carried by the casing 106 of the switch 83. The outer end of the lever 104 carries an anti-friction roller 107 which is normally urged into engagement with the periphery of the cam 82 by a spring 108. The inner end of the lever carries a contact 109 and this contact is electrically connected with the lead wire 91 and is adapted to be moved into and out of engagement with a stationary contact 110 connected with the extension of the wire 91. Hence, when the lever is in engagement with the high point of the cam, the contact 109 is held in engagement with the contact 110 to maintain the circuit closed through the motor 46 and the solenoid 57. Also forming a part of the switch mechanism 83 is a second stationary contact 111, which is arranged in spaced relation to the contact 110, and when the lever rolls off of the high point of the cam, the spring 108 functions to move the lever so that the contact 109 will move out of engagement with the stationary contact 110, and into engagement with the other stationary contact 111. Electrically connected to the stationary contact 111 is a conductor wire 112 and this wire is connected to one terminal of a motor 113. The other terminal of the motor is connected to the return wire 92. The motor 113 is utilized for operating the conveyor C and the circuit to the motor 113 is opened and closed at the proper times so as to operate the conveyor belt 16 in a step by step movement so as to insure the proper positioning and holding of a carton 11 in alignment with the transfer bin or chute 26.

The switch 90 in conjunction with the contacts 99 and 100, serves as means for controlling the circuit to the motor 76 for the ram and the circuit for this motor will now be described. One terminal of the motor 76 is electrically connected to the feed wire 91 by means of a branch wire 114 and the other terminal of the motor has electrically connected thereto a conductor wire 115 which leads to a contact 116 carried by the operating switch lever 117 of the switch 90. A stationary contact 118 is arranged in the path of the movement of the contact 116 and when the lever is in engagement with the ram, the contact 116 is held away from the contact 118. It is to be noted that the lever carries an anti-friction roller for engaging the bottom face of the ram. When the ram moves forwardly and the roller rides off of the ram, the contact 116 is moved into engagement with the stationary contact 118 under the influence of a spring 120 connected with the lever. This contact 118 has electrically connected therewith a wire 121 which leads to the contact 100 of the switch 32. The companion contact 99 has electrically connected thereto a conductor wire 122 which is electrically connected with the wire 115 leading from the ram motor. At this time it is to be also noted that the wire 115 has interposed in the length thereof a time delay relay 123.

Figures 8, 9:
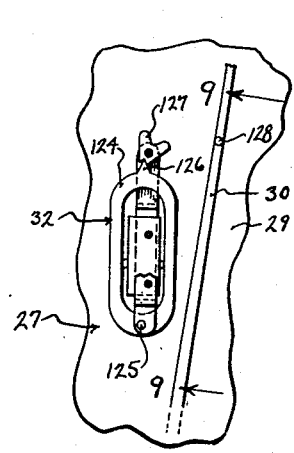
Figure 8 is an enlarged fragmentary detail sectional view taken on the line 8—8 of Figure 9, looking in the direction of the arrows, illustrating the novel switch trip mechanism actuated by the pointer of the weighing scales for setting the ram into operation.
Figure 9 is a detail sectional view taken on the line 9—9 of Figure 8, looking in the direction of the arrows, the view also illustrating the switch trip mechanism.

As heretofore brought out, the switch 32 is incorporated with the weighing scale and is operated from the scale pointer 30. A particular type of switch 32 is employed so that the same can be operated quickly and by a slight pressure, and this switch is known to the trade as a "Micro" switch and can be of the type manufactured by the Micro Switch Division of First Industrial Corporation, Freeport, Illinois. It is noted that any similar type of switch can be used. This switch includes an open frame-like trip lever 124 and this trip lever 124 carries the conductor bridge strip 101 for the pair of contacts 97 and 98 and for the pair of contacts 99 and 100. The lower end of the frame-like switch lever is rockably mounted on a pivot pin 125 rigidly fastened to a part of the frame of the scale. The upper end of the switch lever is provided with a trip bearing point 126. We provide a yoke shaped trip button 127 having a recessed portion at its lower end for receiving the trip point 126. The trip button 127 is rockably mounted and the arms thereof are adapted to be engaged by a trip pin 128 carried by the scale pointer 30. When the pointer moves forwardly under influence of weight on its platform, the pin 128 will engage the yoke arms of the trip button 127 and swing the same on its pivot and move the switch lever 124 to the right (see Figure 8). This will carry the bridge strip 101 into engagement with the contacts 99 and 100 and out of engagement with the contacts 97 and 98. When the weight is removed from the scale platform, the pointer will move to the right and the yoke shaped trip button 127 will move the switch lever 32 to the left and carry the bridge strip into electrical contact with the contacts 97 and 98.

It is to be understood at this point, that only a simplified wiring diagram has been shown and that in actual practice a different wiring arrangement can be set up and used with other appliances for preventing over-loading of the motors, etc.

In operation of our machine, the hopper 24 is filled with the welding rods and the manually operated switch 93 is closed. Initially, the ram is disposed away from the chute as illustrated in Figures 1, 3 and 4, and the various control switches are in the position shown in these figures and diagrammatically illustrated in Figure 10. Consequently, current will flow through the wire 91 through contacts 109 and 110, through the motor 46 and through the windings of the solenoid 57, through the wire 96, through the contact 97, bridge strip 101, contact 98 to the return wire 92, through the branch wire 99'. Likewise, current will flow through the vibrator 33 due to the connection of the terminals thereof with the wires 91 and 92.

Hence, the welding rods will be fed one at a time to the bin or transfer guide 26 and these rods will be leveled off and compacted by the vibrator 33. The rotation of the shafts 40 will prevent jamming of the welding rods in the chute 39 and will prevent the too rapid feed of the rods to the transfer gate. The gate 49 for the chute will be held open in view of the fact that the solenoid is energized.

The circuit to the ram motor is open, and consequently the ram is held at rest. Likewise, the circuit to the conveyor motor 113 is open and the conveyor carrying the cartons is at rest.

When the weight of the welding rods in the transfer guide or bin 26 reaches, say fifty pounds, the pointer 30 will trip the switch 32 so that the bridge strip 101 will move away from the pair of contacts 97 and 98 and into engagement with the contacts 99 and 100. This will open the circuit to the motor 46 and the solenoid 57 in view of the fact that the contacts 97 and 98 are no longer bridged. Consequently, the shafts 40 and their feed rollers or discs 42 will stop and the gate 49 will be rapidly moved to a closed position under the chute 38 by the spring 58 and feeding of the welding rods will immediately stop.

The ram 60 will now move forwardly in view of the fact that the circuit through the ram motor 76 will be closed. The current flow will be as follows: Through wire 91, branch wire 114, motor 76, wire 115, relay 123, wire 122, contact 99, bridge strip 101, contact 100, wire 121 and back to the return wire 92 through the branch wire 129. The ram now performs its function of moving the bundle of welding rods from the transfer guide 26 to the waiting carton 11. As the weight of the rods is relieved from the weighing scale, the pointer 30 will return to its normal position and the switch 32 will be again tripped, causing the bridge strip 101 to leave the contacts 99 and 100 and engage the contacts 97 and 98. As soon as the ram moves forwardly, the switch lever 117 of the switch 99 is tripped and consequently the contact 116 engages the contact 118 and the current to the ram motor is maintained and the current flows as follows: Through wire 91, wire 114, motor 76, wire 115, relay 123, contacts 116, 118, wire 121, branch wire 129, and back to the return wire 92.

It is to be noted that the welding rods are not completely off of the transfer guide until the ram has almost completed its forward stroke, and consequently the pointer 30 does not return to its normal position until the ram has almost completed its forward stroke. As soon as the ram does complete its forward stroke, the lever 104 of the switch 83 rides off of the cam 82 and consequently, the switch carried contact 109 moves away from the contact 110 so that the circuit through the motor 46 and solenoid 57 is still open. Hence, on the return stroke of the ram, the gate 49 for the feed chute will be held closed and the shafts 40 with the rollers 42 will be still. When the contact 109 leaves the contact 110, the same will engage the stationary contact 111 and this will close the circuit to the conveyor motor 113. Hence, on the return stroke of the ram, the conveyor will be operated so as to carry a filled carton 11 away from the machine and a new empty carton to the machine.

The circuit through the conveyor motor 113 is as follows: Through wire 91, contact 109, contact 111, wire 112, conveyor motor 113 and return wire 92.

When the ram 60 completes its return stroke, the switch lever of circuit closer 83 will ride on the cam 82 and consequently the circuit to the conveyor motor will be broken, and the conveyor will again be at rest. At this time, the switch lever of the circuit maker and breaker 99 will be engaged by the ram and the circuit for the ram motor 76 will be open. It is to be also understood that at this time the pointer 30 of the weighing scale will have returned to its normal position, and consequently the contacts 97 and 98 will be bridged and the contacts 99 and 100 for the ram motor will be open.

Due to the bridge of the contacts 98 and 97, the solenoid 57 will again be energized and the circuit will be closed through the motor 46 for rotating the shafts 40 and the rollers 42. Consequently, welding rods will again be fed to the transfer or guide chute 26. The machine is then ready for another operation as described above.

In order to facilitate the transferring of a bundle of welding rods from the transfer chute or guide 26, we can provide a forwardly extending collar or guide throat 130 on the machine. This guide collar or throat leads toward the conveyor and is adapted to align with a carton to be filled.

From the foregoing description, it can be seen that we have provided an exceptionally rugged machine of a complete automatic nature which will effectively fill cartons with an accurate predetermined weight of welding rods, or the like.

Changes in details may be made without departing from the spirit or the scope of our invention, but what we claim as new is:

1. In a machine for filling cartons one after the other with an exact predetermined quantity of rod-like articles, comprising a trough-like bin of a shape in cross section corresponding to the shape in cross section of the cartons to be filled and open at both ends, a weighing scale supporting the bin, means for feeding the articles to the bin, means for leveling off and compacting the articles in the bin whereby the articles will conform to the cross-sectional configuration of the bin and carton, means for moving the articles out of the bin and into a carton, including a pusher member movable longitudinally of the bin and a motor for operating said member, and means starting the motor in operation including an electric circuit embodying the motor and a switch for closing the circuit through the motor actuated by the scale when the articles in the bin reach a predetermined weight.

2. In a machine for filling cartons one after the other with an exact predetermined quantity of rod-like articles, comprising a trough-like bin of a shape in cross section corresponding to the shape in cross section of the cartons to be filled and open at both ends, a weighing scale supporting the bin, means for feeding the articles to the bin, means for leveling off and compacting the articles in the bin whereby the articles will conform to the cross-sectional configuration of the bin and carton, means for moving the articles out of the bin and into a carton, including a pusher member movable longitudinally of the bin and a motor for operating said member, and means for starting the motor in operation including an electric circuit embodying the motor and a switch for closing the circuit through the motor actuated by the scale when the articles in the bin reach a predetermined weight, said means for leveling and compacting the articles in the bin, including a vibrator between the scale and bin.

3. A machine for filling a series of cartons with an exact predetermined weight of rod-like articles, comprising a weighing scale, including a platform and an indicating pointer, a trough-like bin having open ends and mounted on the scale, means for feeding articles to the bin, means for leveling articles in the bin, including a vibrator for the bin carried by the platform of the scale, a reciprocating ram movable longitudinally through the bin for moving articles from the bin into a waiting carton, means including a motor for operating the ram, and means for opening and closing the circuit to the motor actuated by the weighing scale.

4. A machine for filling cartons one after the other with a predetermined quantity of rod-like articles by weight, comprising a trough-like bin open at both ends, means for feeding articles to be packed to said bin, a weighing scale including a platform for supporting the bin and an indicating pointer, a reciprocating ram movable through the bin for sliding articles from the bin into a carton, means including an electric motor for operating the ram, means for closing the circuit to the motor by said pointer when the articles in the bin reach a predetermined weight, whereby the ram will move the articles from the bin into a waiting carton, means operated by the ram for maintaining the circuit closed to the motor when the articles have been removed from the bin into a carton, and means operated by the ram for opening the circuit to the motor when the ram returns to its initial position.

5. A machine for filling cartons one after the other with a predetermined quantity of rod-like articles by weight, comprising a trough-like bin open at its ends, means for feeding articles to be packed to said bin, a weighing scale including a platform for supporting the bin and an indicating pointer, a reciprocating ram movable through the bin for sliding articles from the bin into a carton, means including an electric motor for operating the ram, means for closing the circuit to the motor by said pointer when the articles in the bin reach a predetermined weight, whereby the ram will move the articles from the bin into a waiting carton, means operated by the ram for maintaining the circuit closed to the motor when the articles have been removed from the bin into a carton, means operated by the ram for opening the circuit to the motor when the ram returns to its initial position, and means initiated by the ram for stopping the feeding of articles to the bin during the travel of the ram.

6. A machine for automatically filling cartons one after the other with a predetermined quantity of rod-like articles comprising a hopper for the articles, a trough-like bin open at both ends for receiving the articles from the hopper of a shape in transverse cross-section corresponding to the transverse cross-sectional shape of the carton to be filled, a weighing scale supporting the bin, feeding means for delivering articles from the hopper to the bin, means actuated by the scale for controlling the operation of the feeding means according to the weight of articles in the bin, a pusher member movable longitudinally of the bin for sliding articles from the bin into a carton and operating means for moving said pusher member through the bin including an operating motor operatively connected to the pusher member, an electric circuit including the operating motor, and a switch actuated by the weighing scale to close the circuit through the motor when the articles in the bin reach a predetermined weight.

7. A machine for automatically filling cartons one after the other with a predetermined quantity of rod-like articles as set forth in claim 6 and means returning the pushing member to its initial starting position out of the bin after the moving of the articles from the bin into a carton including a switch actuated by the ram, when said ram reaches a predetermined position in the bin and reversing the rotation of the operating motor.

8. A machine for filling a series of cartons with rod-like articles one after the other by weight comprising a trough-like guide bin having a transverse configuration corresponding to the transverse configuration of a carton to be filled and open at both ends, means bringing cartons into longitudinal alignment with the bin at one end thereof, means for delivering articles to the bin, a weighing scale supporting the bin, pusher means for sliding the articles in the bin into a carton including an electric motor operatively connected to the pusher means, and means actuated by the weighing scale for opening and closing a circuit through the motor according to the weights of articles in the bin.

EDMUND E. LIPPMANN.
ARTHUR W. LIPPMANN.

REFERENCES CITED

The following references are of record in the file of this patent:

UNITED STATES PATENTS

| Number | Name | Date |
| --- | --- | --- |
| 935,506 | Heybach | Sept. 28, 1909 |
| 1,447,715 | Ekstrom et al. | Mar. 6, 1923 |
| 1,627,577 | Salerno | May 10, 1927 |
| 1,881,859 | Mullendore | Oct. 11, 1932 |
| 2,076,617 | Cleaves | Apr. 13, 1937 |
| 2,115,620 | Cave | Apr. 26, 1938 |
| 2,204,134 | Howard | June 11, 1940 |
| 2,324,667 | Baker et al. | July 20, 1943 |

FOREIGN PATENTS

| Number | Country | Date |
| --- | --- | --- |
| 665,572 | Germany | Sept. 28, 1938 |